United States Patent [19]

Ototani

[11] Patent Number: 4,832,742
[45] Date of Patent: May 23, 1989

[54] FLEXIBLE REFINING-AGENT CLAD WIRE FOR REFINING MOLTEN IRON GROUP METAL

[75] Inventor: Tohei Ototani, Tokyo, Japan

[73] Assignee: Metal Research Corporation, Tokyo, Japan

[21] Appl. No.: 192,983

[22] Filed: May 12, 1988

[51] Int. Cl.⁴ .................................................. B22F 1/00
[52] U.S. Cl. .......................................... 75/256; 75/53; 75/58; 75/93 G
[58] Field of Search .................... 75/53, 58, 96 G, 256

[56] References Cited

U.S. PATENT DOCUMENTS

4,108,637  8/1987  Hetke ........................................ 75/53
4,128,414  12/1978  Hater ........................................ 75/53
4,711,663  12/1987  Ferrari ....................................... 75/58

Primary Examiner—Peter D. Rosenberg
Attorney, Agent, or Firm—Sughrue, Mion, Zinn, Macpeak & Seas

[57] ABSTRACT

The disclosed flexible refining agent clad wire comprises a core wire made of refining agent for iron, steel or the like metal, which core wire is clad with a metallic sheath that is made of iron or aluminum, and grooves are formed at certain intervals on the outer surface of the clad wire in a direction lateral or spiral to the longitudinal direction of the refining agent clad wire in such a manner that when the refining agent clad wire is flexed, the grooves are expanded on tension side thereof and contracted on compression side thereof so as to make it flexible.

12 Claims, 8 Drawing Sheets

FIG_1B

FIG_1A

FIG_2B

FIG_2A

FIG_3A

FIG_3B

FIG_3C

FIG_3D

FIG_3E

FIG_3F

FIG_3G

FIG.4A

FIG_4B

FIG_4C

FIG_4D

FIG_4E

FIG_6A

FIG_6B

FIG_6C

FLEXIBLE REFINING-AGENT CLAD WIRE FOR REFINING MOLTEN IRON GROUP METAL

BACKGROUND OF THE INVENTION

1. Field of the Invention

This invention relates to a flexible refining agent clad wire for refining molten iron group metal, and more particularly to a flexible refining agent clad wire for refining molten iron group metal characterized by being flexible. Examples of the iron group metal, which is refined by using the refining agent clad wire for molten iron group metal of the invention, are regular steel, special steel, and alloys whose main ingredient is selected from the group consisting of iron (Fe), nickel (Ni) and/or cobalt (Co).

2. Related Art Statement

The inventors disclosed composite clad wires made of refining agent for iron group metal in the following United States Patents.

U.S. Pat. No. 4,035,892
U.S. Pat. No. 4,698,095
U.S. Pat. No. 4,097,268
U.S. Pat. No. 4,671,820

The cross-sectional shape of the clad wires for molten iron group metal of the above U.S. Patents is not restricted, so that a circular, square, or rectangular cross-section is possible. The refining agent clad wire of a desired cross-sectional shape is made by rolling so that the wire has a uniform cross-section.

The conventional refining agent clad wire for molten iron group metal molten iron group metal has a shortcoming in that, when the cross-section area of the clad wire become large in diameter, it is hard to bend.

It was noted that the refining agent clad wires for molten iron group metal with a circular cross-section having an outside diameter of more than 15 mm were extremely difficult to bend. To avoid this difficulty, U.S. Pat. No. 4,364,770 disclosed refining agent clad wire with a square or rectangular cross-section, but its flexibility has not been found quite satisfactory.

SUMMARY OF THE INVENTION

Therefore, an object of the present invention is to solve the above-mentioned shortcoming of the prior art by providing an improved flexible refining agent clad wire for refining molten iron group metal. In a flexible refining agent clad wire for molten iron group metal according to the present invention, its cross-section varies as it extends in its longitudinal direction, so that one can bend it easily.

A process for making a flexible refining agent clad wire for refining molten iron group metal according to the invention will be described now. A core of wire is formed by using refining agent for molten iron group metal. The refining agent contains at least one metal selected from the following first and second groups; namely, the first group consisting of aluminum, calcium, magnesium, alkali metals, alkaline earth metals, and rare earth metals, and the second group consisting of oxides silicates, carbonates, carbides, and halides of the elements of the above-mentioned first group. A refining agent clad wire is formed by cladding the core wire with a sheath of iron, soft steel, or aluminum. Grooves are formed by pressing at regular intervals on at least a part of the outer surface of the refining agent clad wire in a direction lateral to the longitudinal direction of the refining agent clad wire.

Preferably, the grooves are formed substantially at right angles to the longitudinal direction of the refining agent clad wire. The cross-section of the groove may be of V-shape, U-shape or otherwise curved shape. When the refining agent clad wire is flexed, openings of the grooves on the tension side of the wire are expanded while openings of the grooves on the compression side of the wire are contracted, so that the refining agent clad wire is made flexible.

BRIEF DESCRIPTION OF THE DRAWINGS

For a better understanding of the invention, reference is made to the accompanying drawings, in which.

Throughout different views of the drawing, 1 is a core wire, 2 is a sheath, 3 is an overlapped portion, 4 is a groove, 5 is a refining agent clad wire, 6 is a roll, and 7 is a trapezoidal thread.

DESCRIPTION OF THE PREFERRED EMBODIMENTS

The invention will be described in detail by referring to embodiments which are shown in the accompanying drawings.

Figure 1A:
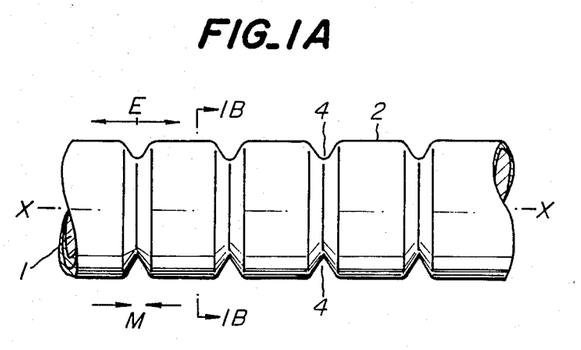
FIG. 1A is a schematic side view of a flexible refining agent clad wire for refining molten iron group metal according to the present invention.
Figure 1B:
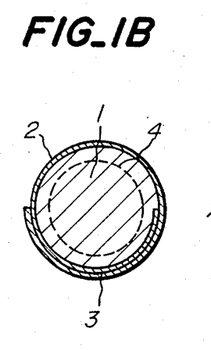
FIG. 1B is a schematic sectional view taken along the line 1B—1B of FIG. 1.

In FIG. 1, a core wire 1 is made of refining agent for iron group metal such as iron and steel. The core wire 1 is clad with a metallic sheath 2 that is preferably formed of an iron or aluminum sheet. The sheath 2 has an overlapped portion 3. With the present invention, grooves 4 are formed at certain intervals on at least a part of the outer surface of the metallic sheath 2 cladding the core wire 1 in such a manner that the grooves 4 extend in a direction lateral to the longitudinal direction X—X of the refining agent clad wire. When the metallic sheath 2 is made by rolling, the longitudinal direction X—X coincides with the rolling direction of the metallic sheath 2, and the grooves 4 are preferably made at right angles to the longitudinal direction X—X of the refining agent clad wire for instance by rolling. In the embodiment of FIG. 1A and FIG. 1B, each of the grooves 4 is of annular shape along circumference of the metallic sheath 2. The cross-section of the groove 4 may be V-shaped, U-shaped or otherwise curved in a recess shape.

Without the grooves 4, the refining agent clad wire tends to become stiffer with increase of its diameter, and it may become hard to bend. More specifically, when the refining agent clad wire is in the form of a round rod with an outside diameter of more than 15 mm, it becomes hardly bendable. In practice, it is very difficult to apply such hardly bendable refining agent clad wire to automatic feeding into molten iron and steel or the like melt to be refined. On the other hand, the above-mentioned grooves 4 make the refining agent clad wire flexible even when its outside diameter exceeds 15 mm, and such flexible refining agent clad wire is easily applicable to automatic feeding into the molten steel or the like melt.

As to the formation of the grooves 4 on the outer surface of the refining agent clad wire of the invention, it is preferable to use small intervals between adjacent grooves because, mechanically speaking, dense grooves provide a high flexibility. Thus, the groove-to-groove interval should be made smaller as far as possible with the increase of the diameter of the refining agent clad wire. The shape of the groove 4 can be determined depending on the cross-sectional area of the refining agent clad wire, the type of the material of the core wire 1, the kind of the sheath 2, and the manner in which the core wire 1 is clad with the sheath 2.

When the refining agent clad wire of the present invention has a circular cross-section, each groove 4 is preferably formed as a closed loop which extends throughout the entire circumference of the sheath 2. On the other hand, when the refining agent clad wire has an elliptic cross-section, the groove 4 is preferably made by pressing the sheath 2 in the direction of the short axis of the elliptic cross-section, so that cross-section of the groove 4 on the tension side (arrow E of FIG. 1A) of the sheath 2 is U-shaped, while the cross-section of the groove 4 on the compression side (arrow M of FIG. 1A) of the sheath 2 is V-shaped. The above formation of the grooves 4 is preferable because, mechanically speaking, it makes the refining agent clad wire easily bendable. It is apparently desirable to make the grooves 4 deeper with the increase of the cross-sectional area of the refining agent clad wire.

In a simple formation of the refining agent clad wire of the invention, each of the grooves 4 is made on one common cross-section of the wire, for instance, in the form of a closed annular groove. However, it is also possible to provide a certain offset between the grooves 4 on the tension side of the wire and the grooves 4 on the compression side of the wire. Such offset may or may not be used because it is just a matter of design choice depending on the circumstances.

Figures 2A, 2B:
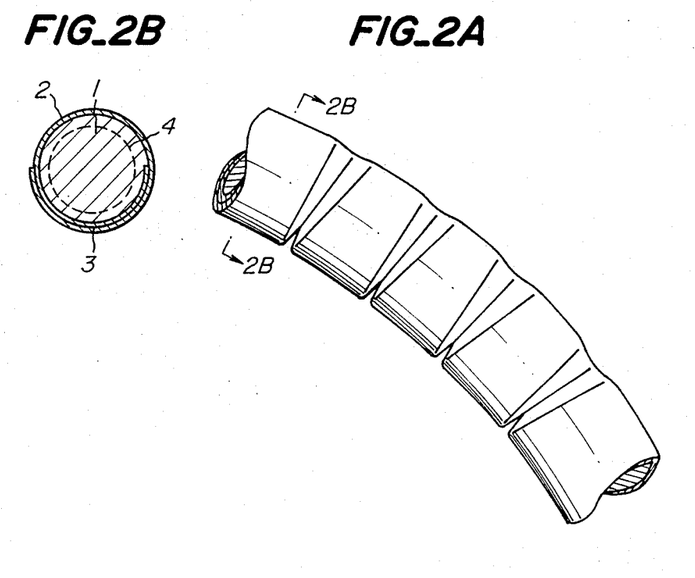
FIG. 2A shows a flexed state of the refining agent clad wire of FIG. 1A.
FIG. 2B is a schematic sectional view taken along the line 2B—2B of FIG. 2A.
Figure 3A:
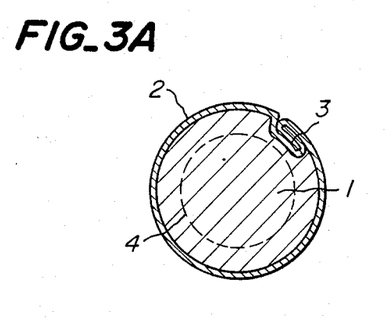
FIG. 3A through FIG. 3G illustrate variations of the cross-section of the refining agent clad wire of the invention.
Figure 3B:
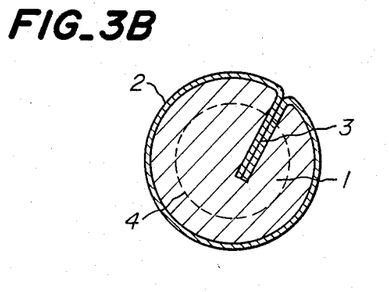
Figure 3C:
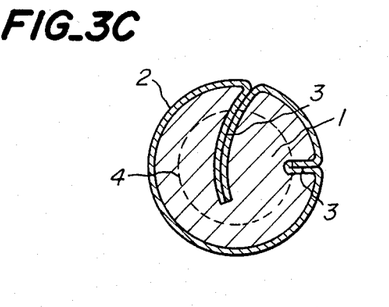
Figure 3D:
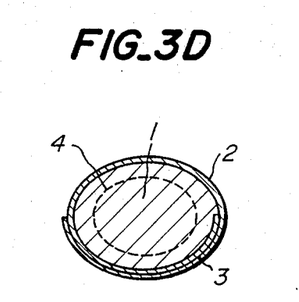
Figure 3E:
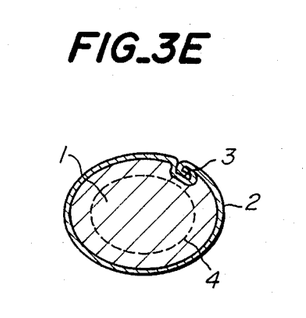
Figure 3F:
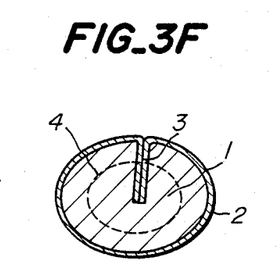
Figure 3G:
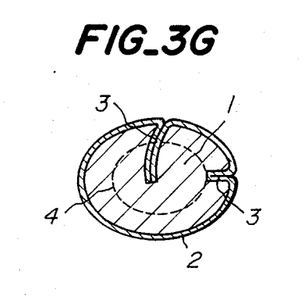

When the sheath 2 is made by cladding a metallic sheet on the core wire 1, opposite edges of such metallic sheet may be laid one over the other and pressed together, for instance, in the form of an overlapped portion 3 of FIG. 1B and FIG. 2B. The grooves 4 may be formed on such overlapped portions 3, too. The opposite edges of the metallic sheet for the sheath 2 ma be treated in various other ways as shown in FIG. 3A through FIG. 3G: for example, folded and pressed as shown in FIG. 3A and FIG. 3E; joined and embedded in the core wire 1 as shown in FIG. 3B, FIG. 3C, FIG. 3F, and FIG. 3G; or overlapped and pressed on the outer surface of an elliptic core wire 1 as shown in FIG. 3D. The sheath 2 may be tightened by providing a local folding as shown in FIG. 3C and FIG. 3G.

It is of course possible to abut the opposite edges of the metallic sheet of the sheath 2 so as to facilitate their joining by seam welding.

The refining agent clad wire of the invention can be applied to the refining of any iron group metal, e.g., regular steel, special steel, and any alloy whose major ingredients are iron (Fe), nickel (Ni) and/or cobalt (Co). For the refining, the refining agent clad wire is fed into a melt of the iron group metal.

The melt of the metal to be refined by the refining agent clad wire of the invention is held in a vessel such as a ladle, a refining furnace or a melting furnace. The vessel may be a lime crucible, or the vessel may be provided with suitable lining, such as lime lining or basic refractory lining containing calcia (CaO) and magnesia (MgO).

The invention will now be described in further detail by referring to Examples.

EXAMPLE 1

A specimen of the refining agent clad wire of the invention was prepared by making a core wire containing 15% aluminum based on the total weight and 45% of calcia (CaO) based on the total weight, cladding the core wire with a 0.7 mm thick soft steel sheath so as to form a clad wire with an outside diameter of 20 mm, and forming 2 mm deep closed circular grooves on the outer surface of the clad wire along its circumference at right angles to the longitudinal direction of the wire at a uniform pitch of 20 mm. Each groove was a recess with a curved contour cross-section.

The specimen was fed into a melt of regular carbon steel with 0.1% carbon (C) in a ladle at a rate of 0.5% of the refining agent clad wire per 1 ton of the melt. The ladle was lined with a material consisting of 30% of magnesia (MgO), 69% of calcia (CaO), and 0.5% of silica ($SiO_2$).

Before refining by the refining agent clad wire of the invention, the melt contained 0.01% of oxygen and 0.03% of sulphur, but after the refining step, oxygen content was reduced to 0.002% and the sulphur content was reduced to 0.007%.

EXAMPLE 2

Another specimen of the refining agent clad wire of the invention was prepared by making a core wire containing 10% aluminum based on the total weight, 5% of calcium, 30% of calcia (CaO), and 10% of calcium fluoride ($CaF_2$), cladding the core with a 0.5 mm thick soft steel sheath so as to form an elliptic cross-section metal-clad with a major axis of 22 mm and a minor axis of 15 mm, and forming 1.5 mm deep closed loop grooves on the outer surface of the metal-clad wire along its circumference at right angles to the longitudinal direction of the wire at a uniform pitch of 15 mm. A part of each groove was a recess with a curved contour cross-section.

The specimen was fed into a melt of regular carbon steel with 0.5% carbon (C) in a 5-ton ladle at a rate of 0.4% of the refining agent clad wire per 1 ton of the melt while blowing argon therein through a porous plug. The ladle was lined with a refractory material consisting of 49.0% of magnesia (MgO), 48.9% of calcia (CaO), and 0.8% of silica ($SiO_2$).

Before refining by the refining agent clad wire of the invention, the melt contained 0.015% of oxygen and 0.025% of sulphur, but after the refining step, the oxygen content was reduced to 0.0015% and the sulphur content was reduced to 0.005%.

EXAMPLE 3

A still further specimen of the refining agent clad wire of the invention was prepared by making a core wire containing 30% calcium silicide based on the total weight, 10% of aluminum, 20% of calcia (CaO), and 10% of calcium fluoride ($CaF_2$), cladding the core wire with a 0.8 mm thick soft steel sheath so as to form the clad wire having an elliptic cross-section with a major axis of 30 mm and a minor axis of 20 mm, and forming 2.5 mm deep grooves on the outer surface of the metal-clad wire in parallel to the major axis at a uniform pitch of 5 mm. A part of each groove was a recess with a curved contour cross-section.

The specimen was fed into a melt of stainless steel with 0.05% carbon (C), 17.8% of chromium (Cr), and 8.1% of nickel (Ni) in a ladle at a rate of 0.3% of the refining agent clad wire per 1 ton of the melt while blowing argon therein through a porous plug. The ladle was lined with dolomite refractories consisting of 40.5% of magnesia (MgO), 59.1% of calcia (CaO), and 0.4% of silica ($SiO_2$).

Before refining by the refining agent clad wire of the invention, the melt contained 0.03% of oxygen and 0.035% of sulphur, but after the refining step, the oxygen content was reduced to 0.005% and the sulphur content was reduced to 0.007%.

EXAMPLE 4

Another specimen of the refining agent clad wire of the invention was prepared by making a core wire containing 30% calcium silicide based on the total weight, 15% of magnesium (Mg), and 10% of calcium fluoride ($CaF_2$), cladding the core wire with a 1 mm thick soft steel sheath so as to form a metal-clad wire with an outside diameter of 8 mm, and forming 1 mm deep closed loop grooves on the outer surface of the metal-clad wire at right angles to the longitudinal direction of the wire at a uniform pitch of 30 mm. Each groove was a recess with curved contour, and the diameter of the metal-clad wire at the bottom of tee closed loop groove was 6 mm.

The specimen was fed into a melt of Permalloy containing 79.25% of nickel (Ni), 5.2% of molybdenum (Mo), 0.0038% of carbon (C), 0.18% of silicon (Si) in a vacuum furnace at a rate of 0.05% of the refining agent clad wire per 1 kg of the melt. The vacuum furnace was lined with a refractory material consisting of 30.5% of magnesia (MgO), 69.0% of calcia (CaO), and 0.5% of silica ($SiO_2$).

Before refining by the refining agent clad wire of the invention, the melt contained 0.025% of oxygen and 0.002% of sulphur, but after the refining step, the oxygen content was reduced to 0.0005% and the sulphur content was reduced to 0.0003%.

EXAMPLE 5

Figure 4A:
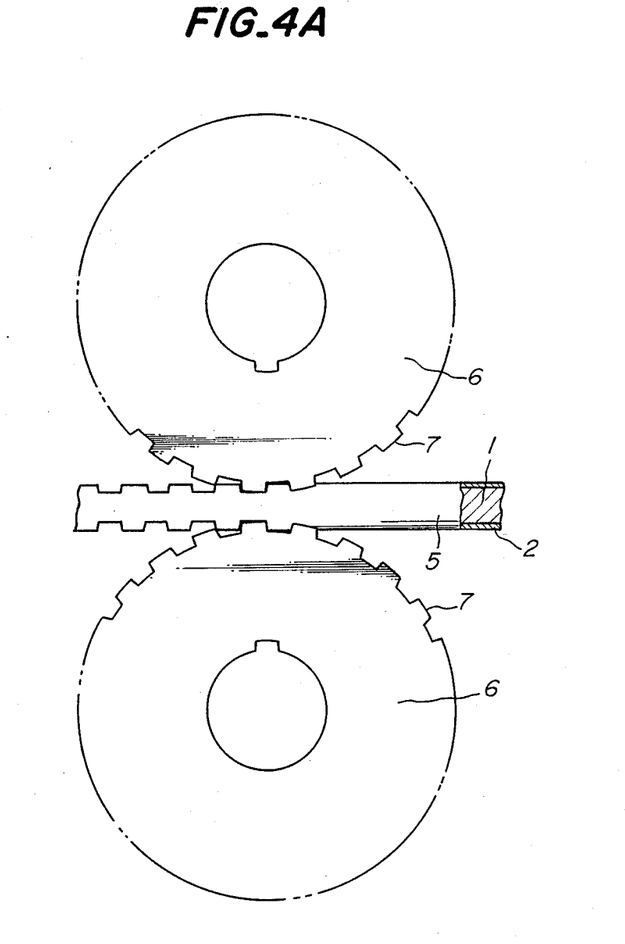
FIG. 4(A) is a diagrammatic illustration of a method of forming flattened grooves on the outer surface of the flexible refining agent clad wire of the invention.
Figure 4B:
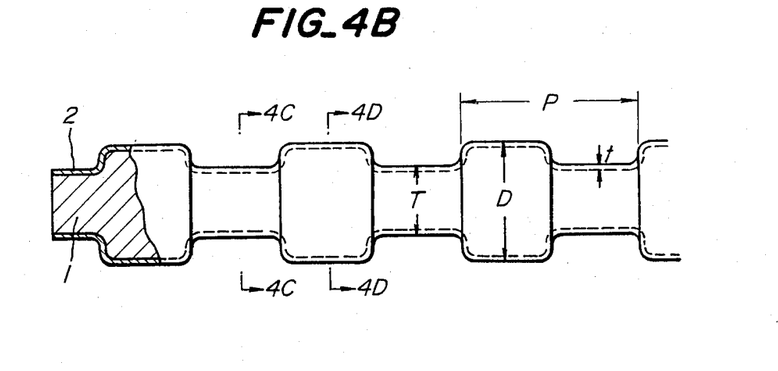
FIGS. 4(B), (C), (D) and (E) are a partly cross-sectional front view, a sectional view taken along the line A—A, a sectional view taken along the line B—B and a front view of the wire according to the present invention.
Figure 4C:
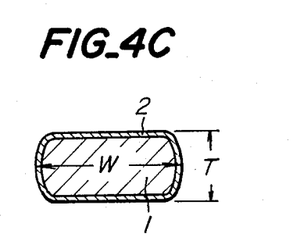
Figure 4D:
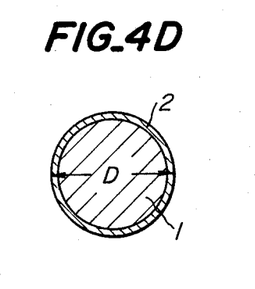
Figure 4E:
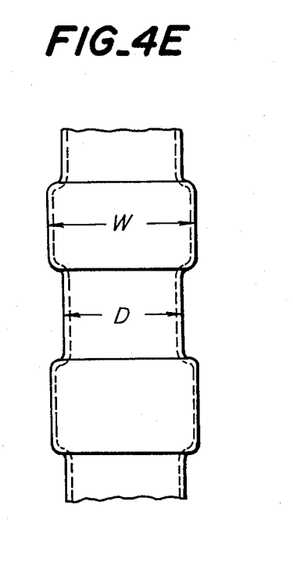
Figure 5A:
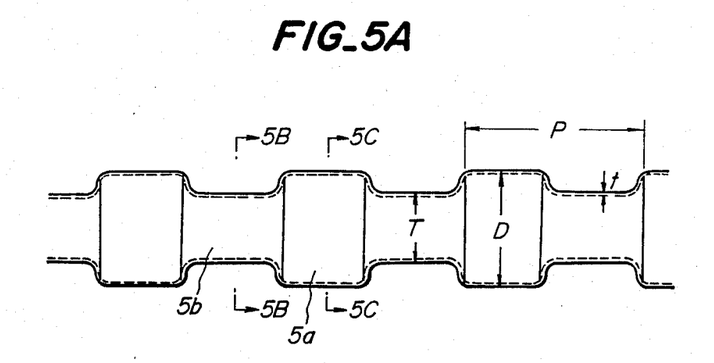
FIG. 5A is a side view of the flexible refining agent clad wire with grooves formed by the method of FIG. 4.
Figure 5B:
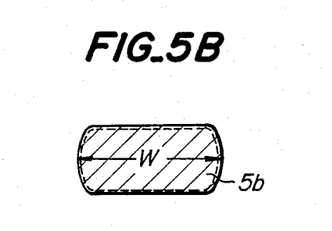
FIG. 5B and FIG. 5C are schematic sectional views taken along the lines 5B—5B and 5C—5C of FIG. 5A, respectively.
Figure 5C:
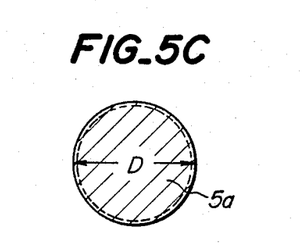

Specimens of the refining agent clad wire of the invention with nominal diameters D of 13 mm, 15 mm, 20 mm and 25 mm were prepared by making core wires containing calcium silicide powder of JIS (Japanese Industrial Standard) class 1 No. 1, and cladding each of the core wires with a 0.3–0.8 mm thick soft steel sheath so as to form metal-clad wires 5 with outside diameters of 13 to 25 mm. Each of the metal-clad wires 5 was treated by a pair of rolls 6 with trapezoidal threads 7 as shown in FIG. 4(A). Thus, flattened portions 5b are formed at a uniform pitch in the round portions 5a of each metal-clad wire 5, as shown in Table 1 and FIG. 5A.

The specimens thus made were fed into the same melt as that of the above Example 3 in a similar manner.

TABLE 1

| Nominal size | Outside diameter D | Thickness T | Width W | Pitch P | (unit: mm) Sheath thickness t |
|---|---|---|---|---|---|
| 13 | 13 | 7.5 | 15 | 18.8 | 0.3–0.5 |
| 15 | 15 | 9 | 18 | 22 | 0.4–0.6 |
| 20 | 20 | 12 | 24 | 28.3 | 0.5–0.7 |
| 25 | 25 | 15 | 30 | 37.7 | 0.5–0.8 |

The diameters of the specimens of this Example 5 were larger than 12 mm, and yet their flexibility was so improved that they proved to be easily applicable to molten metal. With the improved flexibility, conventional difficulty and possible hazard due to stiffness of the refining agent clad wire can be eliminated.

Some of the specimens shown in Table 1 have such large diameters that, with conventional structure, they could have been hardly bendable, but due to the improved structure of the invention they proved to be sufficiently flexible for application to the molten metal. Thus, the yield of the core wire material and the efficiency of the refining of the iron group metal have been considerably improved.

As described in detail in the foregoing, with the present invention, powdery refining agent for iron group metal is compressed into the shape of a core wire, and after cladding it with a metallic sheath, grooves are formed on the outer surface of the metal-clad wire, so that a flexible refining agent clad wire for refining molten iron group metal is provided. The refining agent clad wire of the present invention is easy to handle and it can be stored easily by winding while its smooth and safe pay out for use is ensured.

Thus, the stiffness of conventional refining agent clad wires of large diameter, e.g., larger than 15 mm in case of round wire, which stiffness has hampered smooth feeding of the wire into molten metal, is now eliminated by the present invention. The formation of regularly spaced grooves on the outer surface of the refining agent clad wire substantially in a direction lateral to its longitudinal direction according to the invention provides a sufficient flexibility to the metal-clad wire, so that even when its diameter is large, it can be bend easily for feeding into molten metal. In short, the invention improves the refining efficiency of iron group metal and contributes greatly to the industry.

EXAMPLE 6

Figure 6A:
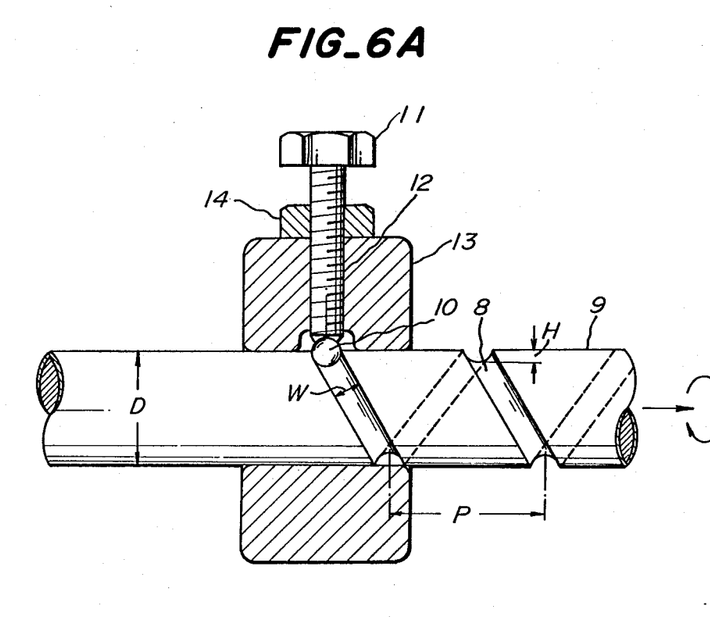
FIG. 6A is a diagrammatic illustration of a method of forming a spiral groove on the outer surface of the refining agent clad wire of the invention.
Figure 6B:
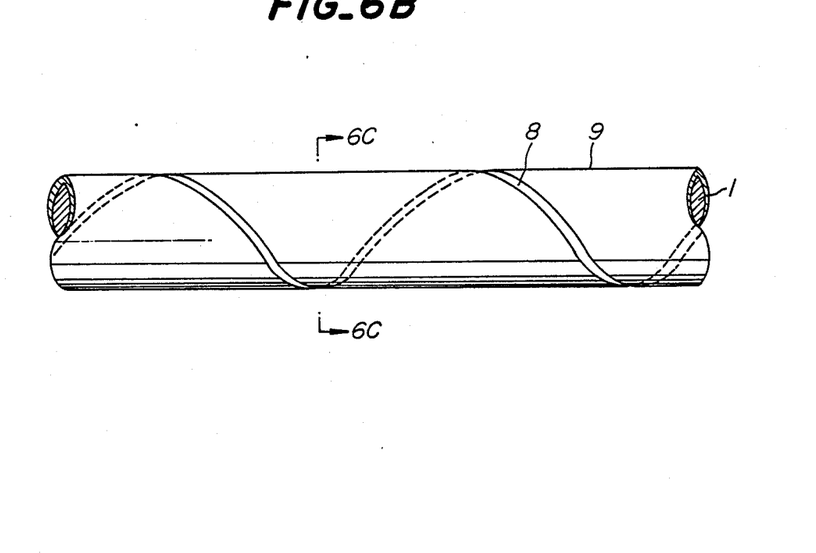
FIG. 6B is a side view of the refining agent clad wire with spiral groove formed by the method of FIG. 6A.
Figure 6C:
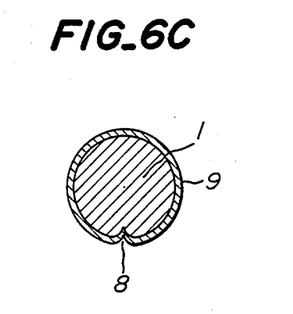
FIG. 6C is a schematic sectional view taken along the line 6C—6C of FIG. 6B.

A specimen of the refining agent clad wire of the invention was prepared by making a core wire containing 15% aluminum based on the total weight and 45% of calcia (CaO) based on the total weight, cladding the core wire with a 0.7 mm thick soft steel sheath so as to form a clad wire-with an outside diameter of 20 mm, and forming 4 mm deep closed circular grooves on the outer surface of the clad wire along its circumference in a spiral form to the longitudinal direction of the wire, said spiral groove was produced a recess with a curved contour cross-section by spiral forming machine as shown in FIG. 6. In FIG. 6, the spiral groove 8 was formed on the outer peripheral surface of clad wire 9 moving without rotation to the allow by compression of a pushing bolt 10 with a wire pushing bolt 11 through a hole 12 of die 13, and said wire pushing bolt 11 was fixed by rack nut 14. The dimension of said clad wire with spiral groove was as follows.

| D | P | H | W | R | Drawing rate of wire m/min | Rotation of rotating die (R.P.M.) |
|---|---|---|---|---|---|---|
| 13 | 25 | 3 | 6 | 3 | 50 | 2,000 |
| 15 | 30 | 4 | 8 | 4 | 60 | 2,000 |
| 20 | 40 | 5 | 10 | 5 | 60 | 1,500 |
| 25 | 50 | 6 | 12 | 6 | 50 | 1,000 |

The specimen was fed into a melt of regular carbon steel with 0.1% carbon (C) in a ladle at a rate of 0.5% of the refining agent clad wire per 1 ton of the melt. The ladle was lined with a material consisting of 30% of magnesia (MgO), 69% of calcia (CaO), and 0.5% of silica ($SiO_2$).

Before refining by the refining agent clad wire of the invention, the melt containing 0.01% of oxygen and 0.03% of sulphur, but after the refining step, oxygen content was reduced to 0.002% and the sulphur content was reduced to 0.007%.

Although the invention has been described with a certain degree of particularly, it is understood that the present disclosure has been made only by way of example and that numerous changes in details of construction and the combination and arrangement of parts may be resorted to without departing from the scope of the invention as hereinafter claimed.

What is claimed is:

1. A flexible refining agent clad wire for refining molten iron group metal, comprising a core made of refining agent for iron group metal, a metallic sheath cladding the core and having a thickness in the range of 0.3–1.0 mm, said metallic sheath being made of a metal selected from the group consisting of iron and aluminum, and grooves formed at certain intervals on outer surface of the metallic sheath of clad wire and having a diameter in the range of 8–25 mm, each of said grooves extending in a direction lateral to longitudinal direction of the clad wire in such a manner that when the refining agent clad wire is flexed, the grooves are expanded on tension side thereof and are contracted on compression side thereof so as to make the refining agent clad wire flexible.

2. A flexible refining agent clad wire as set forth in claim 1, wherein said refining agent clad wire has a circular cross-section with a diameter in the range of 8–55 mm, and said grooves are formed at uniform intervals on at least a part of the outer surface of the refining agent clad wire in a direction lateral to the longitudinal direction of the refining agent clad wire.

3. A flexible refining agent clad wire as set forth in claim 1, wherein said refining agent clad wire has an elliptic cross-section and said grooves are formed at uniform intervals on at least a part of the outer surface of the refining agent clad wire in a direction lateral to the longitudinal direction of the refining agent clad wire.

4. A flexible refining agent clad wire as set forth in claim 1, wherein said refining agent clad wire is so flexible as to be fed into molten iron group metal in a vessel lined with basic refractory material.

5. A flexible refining agent clad wire as set forth in claim 4, wherein said vessel is a ladle.

6. A flexible refining agent clad wire as set forth in claim 1, wherein said vessel is a refining furnace.

7. A flexible refining agent clad wire as set forth in claim 1, wherein said vessel is a melting furnace.

8. A flexible refining agent clad wire as set forth in claim 1, wherein said core of refining agent clad wire is made of at least one metal selected from first and second groups, the first group consisting of aluminum, calcium, magnesium, alkali metals, alkaline earth metals, and rare earth metals, the second group consisting of ox-ides, silicates, carbonates, carbides, and halides of the elements of the above first group, and said metallic sheath being made of a metal selected from the group consisting of soft steel and aluminum.

9. A flexible refining agent clad wire as set forth in claim 1, wherein said refining agent clad wire has a circular cross-section and said grooves are formed at uniform intervals at a part of the outer surface of the refining agent clad wire at right angles to the longitudinal direction of the refining agent clad wire.

10. A flexible refining agent clad wire as set forth in claim 1, wherein said refining agent clad wire has an elliptic cross-section and said grooves are formed at uniform intervals at a part of the outer surface of the refining agent clad wire at right angles to the longitudinal direction of the refining agent clad wire.

11. A flexible refining agent clad wire as set forth in claim 1, wherein said refining agent clad wire has an elliptic cross-section and said grooves are produced in form of curved shape at uniform intervals at a part of the outer surface of the refining agent clad wire in a direction lateral to the longitudinal direction of the refining agent clad wire.

12. A flexible refining agent clad wire as set forth in claim 1, wherein said grooves are produced in form of spiral along the outer surface of the refining agent clad wire in a direction spiral to the longitudinal direction of the refining agent clad wire.

* * * * *